Figure 1:
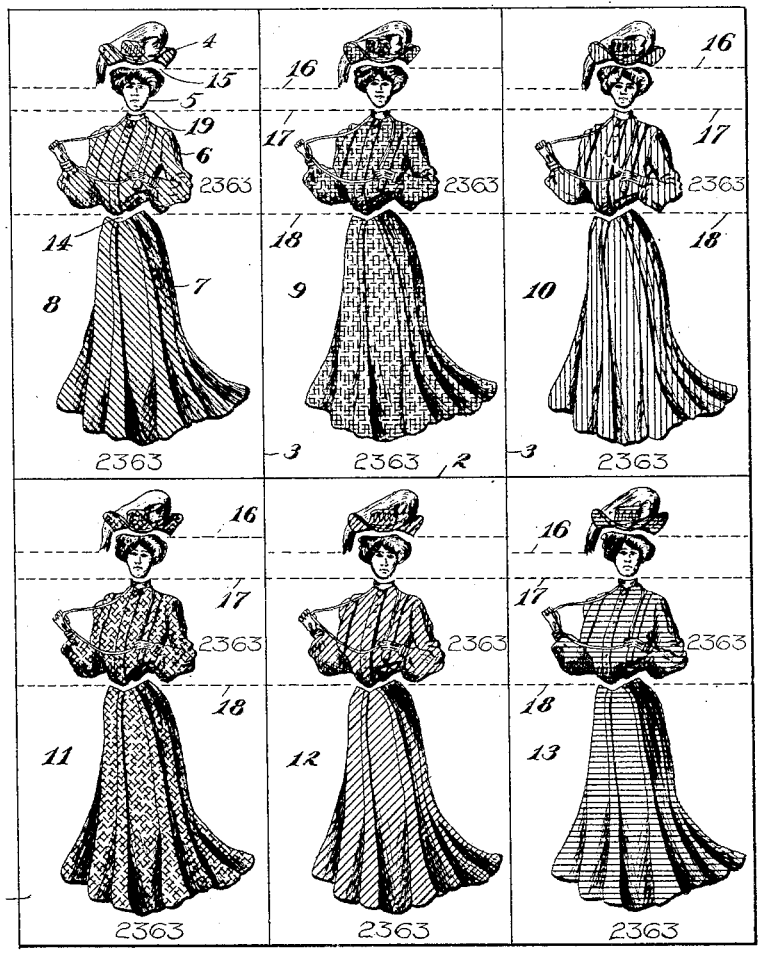

No. 805,432. PATENTED NOV. 21, 1905.
W. FREEMAN.
FASHION CHART.
APPLICATION FILED MAY 9, 1905.

WITNESSES:
William M. Hilbert
Bertha Schmier

INVENTOR.
William Freeman
BY
B. B. Stickney
ATTORNEY

UNITED STATES PATENT OFFICE.

WILLIAM FREEMAN, OF BROOKLYN, NEW YORK.

FASHION-CHART.

No. 805,432.  Specification of Letters Patent.  Patented Nov. 21, 1905.

Application filed May 9, 1905. Serial No. 259,558.

*To all whom it may concern:*

Be it known that I, WILLIAM FREEMAN, a citizen of the United States, residing in Brooklyn, in the county of Kings and State of New York, have invented certain new and useful Improvements in Fashion - Charts, of which the following is a specification.

This invention relates to means for facilitating the selection of dress-patterns and colors or shades of dress goods to be purchased and used in making a dress from the selected pattern.

There is no way for women to learn at their homes the various prevailing shades of dress material or to study the same leisurely. They are obliged to go to stores where different kinds of material are kept and look through a large quantity of different kinds of dress goods, thus consuming a great deal of their own time, as well as the time of the salesmen, while owing to lack of opportunity for deliberating upon the colors or studying the effects of different shades or colors upon each other, as of a skirt and a waist, a purchaser frequently makes a selection which proves disappointing after the dress is made. This arises either through her own haste or sometimes from the indisposition of the salesman, who usually displays only such colors as are asked for. It frequently happens that late styles of colors and shades of dress material are not kept in stock, and hence not seen by the customer, who is thus apt to be misled and purchase some color that is out of date. It also happens that those who live remote from the large cities and cannot conveniently make shopping trips must write to the city stores for samples of prevailing shades, and often the clerk or manager will mail in return not the prevailing colors, but such goods as the store would like to get rid of. Moreover, it is out of the question for the purchaser of the dress goods to determine in advance precisely how any particular fashion or style of dress will look in any selected color, and it often happens that a pleasing color of dress goods does not make up into a pleasing dress of the particular style or pattern selected.

The object of my invention is to enable a person to obtain readily an idea of the appearance that will be afforded by different colors of dress material as made up in dress garments of a selected pattern or style and to make it practicable to place before the user means for readily selecting from the prevailing colors of dress goods such plain colors or combinations as are best adapted for her own style of beauty, as well as for the particular fashion that she fancies, and to enable her to form adequate ideas of the different effects of differently - colored waists with differently-colored skirts and hats and to make up several pleasing combinations of hats, waists, and skirts before making a selection and purchase.

In carrying out my invention I provide each individual pattern for a dress garment, such as a skirt or waist, with a set of printed miniatures comprising skirts and waists and all illustrating the appearance and style of a finished dress garment to be made up from the individual dress-pattern—that is, each individual pattern is provided with its own individual miniatures, which are different from the miniatures of other dress-patterns. I color the miniatures in each set differently from one another, so that a study may be made of them with a view of selecting a color of dress material that will please the fancy of the user for the particular style of dress in hand. In order to increase the range of selection, I also separate all the skirts from the waists by corresponding lines of severance, so that the miniatures may be cut out along said lines, thus enabling different waists to be juxtaposed to different skirts and the effect of the various contrast of colors studied until a selection is made such as is best suited to a particular style of dress and as well to the individual style of the wearer. Then the selected colors may be shown by the purchaser to the dress-goods salesman, so that no time is lost in going over an assortment of dress goods and the purchaser gets just the color that is best suited to her and she is, moreover, sure to get a prevailing color, since the miniatures will be printed from week to week as the fashions and colors change.

Figure 2:
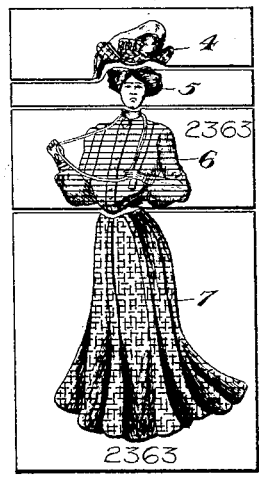

In the accompanying drawings, Figure 1 is a view of a sheet of paper having printed thereon a set of numerous miniatures of the same fashion or style, but in different colors. Fig. 2 illustrates how the parts of several miniatures may be reassembled or interchanged after cutting apart, so as to afford an idea of the appearance of a dress made with any contrasting colors of hat, waist, and skirt.

Upon a sheet 1, which may be divided by horizontal printed lines 2 and vertical lines 3 into a set of spaces, I print a set of miniatures, one upon each of said spaces, each miniature preferably comprising a hat 4, a head 5, a waist 6, and a skirt 7. Preferably the hat, waist, and skirt of each miniature are printed in one color—that upon space 8, for instance, being green, that upon space 9 yellow, that upon space 10 red, that upon space 11 orange, that upon space 12 purple, and that upon space 13 blue.

The colors of the miniatures may first be studied by the user to gain an idea of the effect of a single color for both skirt and waist; but if no selection to her taste can be made from the miniatures in their original condition they may be cut up into skirt, waist, and hat or head and hat portions. For this purpose each skirt may be separated from the waist, thus leaving a severing line or space 14, and each hat may also be separated from the head, leaving a similar line or space 15. The severance-lines correspond in all the miniatures, and after they are cut apart it will be a simple matter to place differently-colored waists and skirts in juxtaposition, as at Fig. 2, in which a yellow skirt is seen placed below a blue waist and the head is surmounted by an orange hat. I prefer to print upon each of the spaces 8 to 13 a set of transverse dotted lines 16 17 18, which form continuations of the severance-lines 15, 19, and 14, the line 19 being between the head and the waist-collar. In cutting up the miniatures these dotted lines may be followed. It will be seen that different waists may be juxtaposed to different skirts and also that different hats may be tried. The heads 5 may be printed to represent different types of features, as blondes and brunettes, and the miniatures may be printed with each type of features associated with its own most effective color or shade of dress. Each individual dress-pattern furnished to the consumer may be provided with its own complete individual set of miniatures.

Thus the user acquires knowledge which under present conditions cannot be gained until after the dress is made up. The sheets or sets of similar miniatures may also be supplied to intending purchasers, who may study them before deciding to buy the pattern itself, so that a mature choice may be made of both style and color before going to any expense. For this purpose both pattern and set of miniatures may be marked with the same identifying number, as "2363," the same appearing upon both waist and skirt sections. I prefer to print these miniatures directly upon newspaper-supplements or pages of newspapers that bear printed nests of dress-patterns, such as described in my pending application, Serial No. 140,364, filed January 24, 1903. Printed instructions may also be placed upon the sheets, explaining fully the operation and advantages of the invention, giving full directions for use.

As set forth in said application, different sizes of patterns may be printed in different colors, and an economy is effected by using the same colors upon the miniatures, since the latter may be printed at the same impression with the pattern parts and all expense avoided after the metal printing-plates are once prepared. It will also be understood that the miniatures may be printed upon a sheet or sheets upon which are printed a set of waist-pattern parts or nests—that is, the miniatures show both waists and skirts, and hence may be employed as an adjunct to either a skirt-pattern or a waist-pattern of the style illustrated by the miniature. Each nest in the pattern may be provided with the identifying numbers, as "2363."

The severing-line 19 between the head and waist is provided so that the user may cut out only the hat, waist, and skirt, and may use these parts to dress up her own photograph, so as to gain a better idea of the appearance she will make in the complete dress of the style and color she fancies. It will be a further advantage for the miniatures in the set to be printed with different styles of hats all adapted to the style of the waist and skirt, so that the user can gain an idea of the appropriate color and style of hat to be chosen to go with the selected style and color of dress.

Having thus described my invention, I claim—

1. As an article of manufacture, a sheet of paper having printed thereon a set of numerous similar miniature full figures, having skirts, waists, heads and hats and illustrating the appearance or style of one individual finished dress garment, and colored differently from one another, all the skirts slightly spaced apart from the waists, and all the hats likewise spaced apart, whereby the colors of the miniatures may first be studied with a view of selecting dress goods corresponding to one thereof, and whereby if no selection can be made from the original miniatures, the same may be cut up into skirt, waist and hat portions, and different waists may be juxtaposed to different skirts and correlated with different hats and the effect of the various contrasts of colors studied, until a selection is made.

2. As an article of manufacture, a sheet of paper having printed thereon a set of numerous similar miniature feminine full figures, dressed in skirts and waists, and all illustrating the appearance or style of one individual finished dress garment, each miniature colored differently from all the others, the figures so arranged that each waist portion may be severed from the skirt portion by a single simple cut directly across the body, whereby after such severance, different waists may be juxtaposed to different skirts and the effect of the various contrasts of colors studied.

WILLIAM FREEMAN.

Witnesses:
B. C. STICKNEY,
BERTHA SCHNIER.